United States Patent
Reel, Jr. et al.

(10) Patent No.: US 10,378,590 B2
(45) Date of Patent: Aug. 13, 2019

(54) MODULAR DRIVELINE YOKE

(71) Applicant: J. E. Reel Truck Parts, Inc., Pomona, CA (US)

(72) Inventors: James Edward Reel, Jr., Pomona, CA (US); Jayson Miles, Riverside, CA (US)

(*) Notice: Subject to any disclaimer, the term of this patent is extended or adjusted under 35 U.S.C. 154(b) by 319 days.

(21) Appl. No.: 15/268,327

(22) Filed: Sep. 16, 2016

(65) Prior Publication Data

US 2017/0082154 A1 Mar. 23, 2017

Related U.S. Application Data

(60) Provisional application No. 62/219,843, filed on Sep. 17, 2015.

(51) Int. Cl.
*F16D 3/38* (2006.01)
*F16D 1/076* (2006.01)

(52) U.S. Cl.
CPC ............ *F16D 3/387* (2013.01); *F16D 1/076* (2013.01); *F16B 2200/506* (2018.08); *Y10S 464/905* (2013.01)

(58) Field of Classification Search
CPC .... F16B 21/18; F16B 2200/506; F16D 1/033; F16D 1/076; F16D 3/382; F16D 3/387; F16D 3/40; F16D 3/405; F16D 3/41; Y10T 403/645; Y10T 403/7182
USPC ......... 464/134, 135, 182, 905; 403/337, 398
See application file for complete search history.

(56) References Cited

U.S. PATENT DOCUMENTS

| | | | | |
|---|---|---|---|---|
| 2,625,416 | A * | 1/1953 | Fellows | F16D 1/076 403/20 |
| 2,803,474 | A * | 8/1957 | Wilson | F16D 1/108 403/336 |
| 4,461,195 | A * | 7/1984 | Barnick | B23B 51/0473 82/158 |
| 4,637,807 | A * | 1/1987 | Koelling, Sr. | F16D 3/41 464/135 |
| 4,702,722 | A * | 10/1987 | Narue | F16D 3/40 464/134 |
| 6,881,152 | B2 * | 4/2005 | Erlmann | F16D 3/387 464/135 |
| 6,893,349 | B2 * | 5/2005 | Krugman | F16D 3/38 464/182 |
| 7,029,398 | B1 * | 4/2006 | Burnard | F16D 3/387 464/134 |
| 7,213,999 | B2 * | 5/2007 | Haas | F16B 5/0275 403/337 |
| 8,499,457 | B2 * | 8/2013 | Kobayashi | F16D 1/076 29/898.07 |
| 9,309,929 | B2 * | 4/2016 | Raymond | F16D 1/06 |

FOREIGN PATENT DOCUMENTS

EP 0821171 A1 * 1/1998 ............. F16D 3/387

* cited by examiner

*Primary Examiner* — Josh Skroupa
(74) *Attorney, Agent, or Firm* — Benjamin Diederich

(57) ABSTRACT

A modular driveline yoke assembly for use in a motor vehicle having separate yoke and flange portions that directly abut each other. The flange portion having dowels that extend into recesses within the yoke portion, and bolts that extend through both portions to secure the two together. The assembly is configured such that various yoke portions and various flange portions will all be compatible to fit together.

15 Claims, 4 Drawing Sheets

MODULAR DRIVELINE YOKE

CROSS-REFERENCE TO RELATED APPLICATIONS

This application claims the benefit of U.S. Provisional Application No. 62/219,843, filed on Sep. 17, 2015, titled MODULAR DRIVELINE YOKE, the teachings of which are expressly incorporated by reference.

STATEMENT RE: FEDERALLY SPONSORED RESEARCH/DEVELOPMENT

Not Applicable

BACKGROUND

1. Field of the Invention

The present disclosure relates generally to vehicle drivelines, and more particularly to modular yoke assemblies for drivelines.

2. Description of the Prior Art

In general, the purpose of a driveshaft is to transmit torque and rotational motion at a fixed or varying angular relationship from one shaft to another and, when necessary, to account for axial movement. A driveshaft is an assembly consisting of one or two universal joints connected by a solid or tubular shaft. There are thousands of different driveshafts and driveshaft component configurations. All driveshafts incorporate one or more universal joints. A universal joint is a mechanical device that can transmit torque and/or rotary motion from one shaft to another at fixed or varying angles of intersection of the shaft axis. In order to function as intended, these universal joints are mated with at least one yoke. A yoke is a device that unites, couples, or connects, and is the basic torque input and output component within a driveline by connecting a universal joint to another component within the driveline. A yoke is typically contained within a yoke assembly made up of a yoke portion and a barrel portion. The barrel portion connects the shaft to the yoke portion. Further, the yoke portion is also connected to a cruciform for rotation about an independent axis. The cruciform includes four orthogonal trunnions with each opposing pair of axially aligned trunnions mounted in a pair of aligned bores within a yoke.

Typically a bearing cup is secured in each bore and a bearing assembly is retained in the bearing cup such that each yoke is supported for pivotal movement relative to a pair of the trunnions. Various conventional universal joints having yoke portions are known to those skilled in the art. However, the yoke and barrel portions are typically formed from a unitary member. Therefore, different yoke and barrel portions are typically not interchangeable with each other. In instances where the yoke portion and the barrel portion are formed from separate members and attached, they typically are formed only to mate with a specific other piece, and as such cannot be easily mixed and matched for uses with different components. Furthermore, the point of attachment can often result in a weakness of the yoke assembly, which can lead to potential breakdown with over time with use.

As such, there is a need for a yoke assembly that allows for easy, and universal, mating between differing yoke portions and differing barrel, or flange, portions. Furthermore, there is a need for a yoke assembly with great strength that will minimize shear forces between the yoke portion and the barrel portion.

BRIEF SUMMARY

In accordance with one embodiment of the present disclosure, there is contemplated a modular driveline yoke assembly for use in a motor vehicle. The assembly has both a yoke portion and a flange portion. The yoke portion has two arms extending from a base, bolt holes extending through the base, recesses formed within the lower side of the base, and an open centrally positioned bore. The flange portion is configured to attach to another portion of a driveline, and has its own base containing bolt holes. The flange portion further includes dowels extending upward from the upper side of the flange base. The yoke portion and flange portion are attached to each other by bolts positioned within, and extending through, the bolt holes in the yoke base and the flange base, and secured with nuts attached to the bolts. When fully assembled, the yoke base and the flange base directly abut each other, and the dowels extending from the upper side of the flange base are inserted into the recesses in the yoke base.

The modular driveline assembly is designed such that various yoke portions can be attached to various flange portions to allow for the greatest amount of flexibility in designing the driveline assembly, without the need to have flange portions designed to match a specific yoke portion.

In one embodiment, the assembly utilizes four bolts, four nuts, and four dowels. The dowels may be unitarily formed within the flange base, pressed into the flange base, welded to the flange base, or separate components.

In one embodiment, the modular driveline assembly further includes a locking washer portion. The locking washer portion may be made up of a substantially circular and raised retaining portion formed into a central portion of the flange base, a nut configured to sit within the flange retaining portion, a circular lock washer configured to engage, and retain, the nut, and a C-clip positioned on top of the lock washer. The flange retaining portion is configured to have inwardly facing detents formed within its sidewall, and a retaining groove formed around the inside circumference of the sidewall. Further, the lock washer has internal notches that engage the nut head and indexing tabs that extend outward from its outside diameter. The indexing tabs are configured to be inserted within the retaining portion detents to prevent the rotation of the lock washer, and respectively that of the nut, and the C-clip is configured to seat within the retaining groove to maintain the lock washer in position within the detents.

The nut may be, for example, a 6-point, 12-point, or a 24-point nut. The lock washer may have four indexing tabs distributed around its circumference, and they may be circular in shape. The indexing tabs may be located equidistantly around the circumference of the lock washer or may be located at varying distances around its circumference. The lock washer may have, for example, twelve, eighteen, or twenty-four notches internal notches. In a preferred embodiment, that lock washer has eighteen internal notches. In a preferred embodiment, the lock washer is configured to lock the nut every 2.75 degrees.

In another embodiment, the flange portion further includes a female slip shaft extending downward from the flange base. The female slip shaft is configured to engage with a standard slip male driveline component.

In yet another embodiment, the flange portion further includes a series of base steps extending downward from the flange base. In particular, each of the base steps decreases in diameter from that of the base step above it to allow for the welding on of tubes of various sizes to a single flange portion. That is, you would not need to select the exact flange portion but could utilize a single flange portion with tubes of various diameters to ease in the assembly of the driveline, and to minimize the need for multiple parts.

The present disclosure also envisions a method of assembling a yoke assembly. The yoke assembly is assembled by first selecting a yoke portion. Wherein the yoke portion has two arms extending from a base, bolt holes extending through the yoke base, and recesses formed within a lower side of the base. Next, one selects a flange portion from a group of flange portions. The flange portions all have a base with bolt holes extending throughout, and dowels extending upward from the upper side of the flange base. The group of flange portions each has a flange base configured to abut and engage the yoke base. The yoke base is then abutted to the flange base, such that the dowels are positioned within the recesses. Finally, the yoke portion is secured to the flange portion by inserting bolts through the yoke bolt holes and flange bolt holes and engaging nuts to the bolts.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 1A:
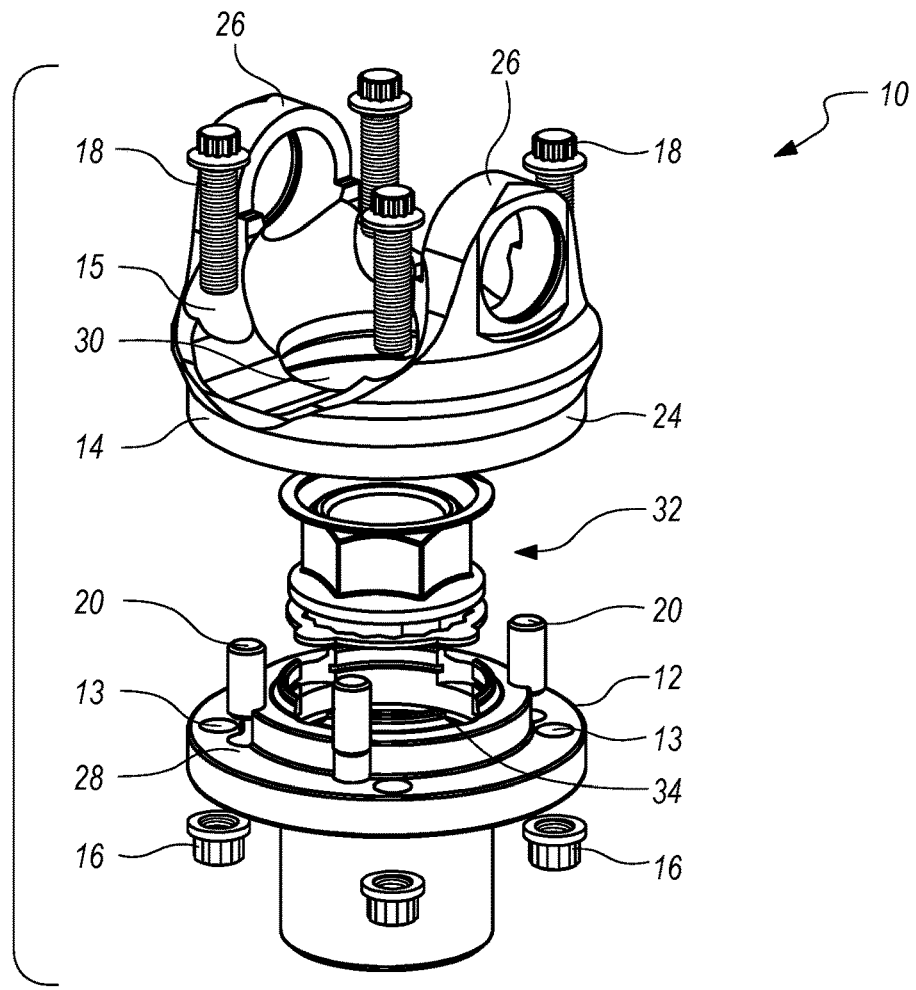
FIG. 1A is an exploded perspective view of a yoke assembly of the present disclosure.
Figure 1B:
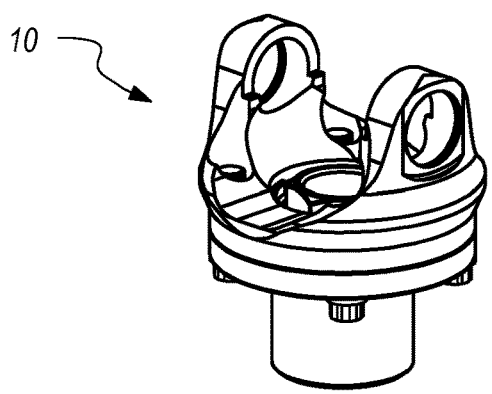
FIG. 1B is a perspective view of the yoke assembly shown in FIG. 1.
Figure 2A:
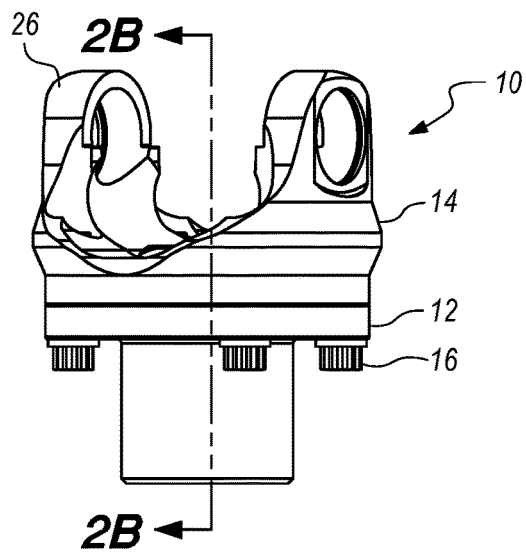
FIG. 2A is a side view of the yoke assembly shown in FIGS. 1A-1B.
Figure 2B:
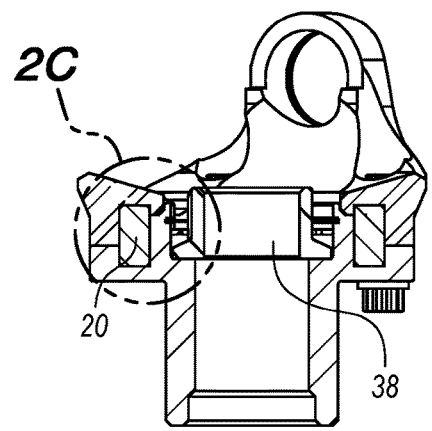
FIG. 2B is a cross-sectional view of FIG. 2A shown across the line 2B-2B.
Figure 2C:
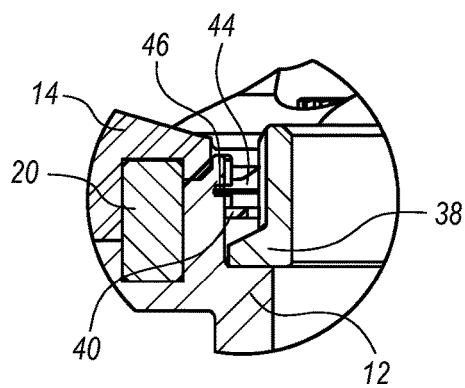
FIG. 2C is a detail view of a portion of the yoke assembly shown in FIG. 2B.
Figure 3:
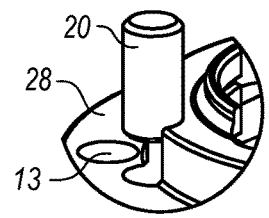
FIG. 3 is a detail view of the dowel and flange configuration shown in FIG. 1A.

As shown in FIG. 1, the present disclosure generally envisions a modular yoke assembly 10. The yoke assembly 10 includes a flange portion 12 and a yoke portion 14 connected to each other with a plurality of nuts 16 and bolts 18. As shown in this embodiment, when the yoke assembly 10 is assembled, the bolts 18 extend through the holes 15 in the yoke portion 14 into, and through, holes 13 in the flange portion 12, and secure the flange portion 12 to the yoke portion 14 with nuts 16 threaded on to the bolts 18 on a far side of the flange portion 12.

Furthermore, the yoke assembly 10 comprises a plurality of dowels 20 secured in a base 28 of the flange portion 12. The dowels 20 may be formed as a unitary piece with the flange portion 12, or may be later attached to the flange portion 12 by welding or other securing methods. Alternatively, the dowels 20 may be inserted into recesses (not shown) within the flange base 28 rather than being permanently attached to the flange portion 12.

Figure 4:
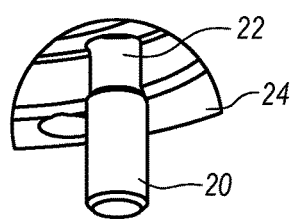
FIG. 4 is a detail view of the dowel and yoke configuration shown in FIG. 1A.

As best seen in FIG. 4, the dowels 20 are inserted into recesses 22 formed within the yoke portion 12 to provide further torque strength to the yoke assembly 10. The dowels 20 may be pressed into counterbores formed in the flange base 28. The yoke portion 12 then slides over the remaining exposed portion of the dowels 20, such that they are contained within the recesses 22 formed within the yoke base 24. Thus, the inherent backlash in prior art designs is eliminated by the present design. The grip length on the yoke utilizes half of the diameter, creating a sheer plane that is parallel to the dowels' direction. Under operational load, a typical dowel usage creates a high stress concentrated sheer plane across its diameter only, effectively wanting to sheer the pin in half at its thinnest or weakest point. In contrast, in the present disclosure the dowels use various faces to utilize more surface area, increasing its grip length to the depth of the counterbore it is pressed into. By loading the dowel in multiple planes, including the cross sections of its diameter and the cross section of it entire length, the pin strength is vastly increased over the prior art. Accordingly, the bolts 18 are primarily used to clamp the flange portion 12 and yoke portion 14 together, rather than to provide the sole source of rotational strength. The orientation of bolts 18 and dowels 20 create an even distribution of mass to maintain an even rotating balance.

The yoke portion 14 comprises a base 24 and a pair of yoke arms 26 that extend outwardly from the yoke base 24. When fully assembled, the yoke base 24 abuts the flange base 28. Furthermore, the yoke portion 14 further includes a central bore 30, configured to receive elements of the respective flange portion 12.

Figure 5:
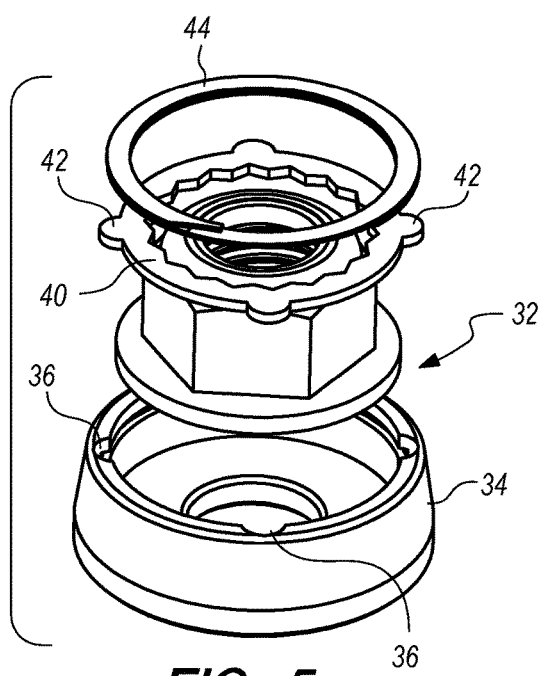
FIG. 5 is an exploded detail view of the washer locking system shown in FIG. 1A.

The embodiment of the present disclosure shown in FIGS. 1-6 envisions a yoke adapter that further comprises a locking washer portion 32, as seen in FIG. 1A and in exploded detail in FIG. 5. The locking washer portion 32 contains a nut 38 that is configured to sit within a retaining portion 34 formed into a central portion of the flange base 28. The nut 38 may be a 6-point, 12-point, or 24-point nut. The locking washer portion 32 further includes a circular lock washer 40 that sits over the nut 38. The lock washer 40 includes a plurality of indexing tabs 42 extending outward from its outside diameter. In one embodiment, there are four indexing tabs 42 distributed around the circumference of the lock washer 40. In a preferred embodiment, the indexing tabs 42 are circular in shape. The flange retaining portion 34 is configured with a plurality of detents 36 configured to accept, and contain, the indexing tabs 42 to prevent rotation of the lock washer 40. Accordingly, while the number of indexing tabs 42 and detents 36 may be equal, in no case may there be fewer detents 36 than indexing tabs 42. Finally, the locking washer portion 32 includes a C-clip 44 that sits on top of the lock washer 40 and, when installed, sits within a retaining groove 46 formed around the inside circumference of the flange retaining portion 34 to maintain the lock washer 40 in position within the detents 36.

Figure 6:
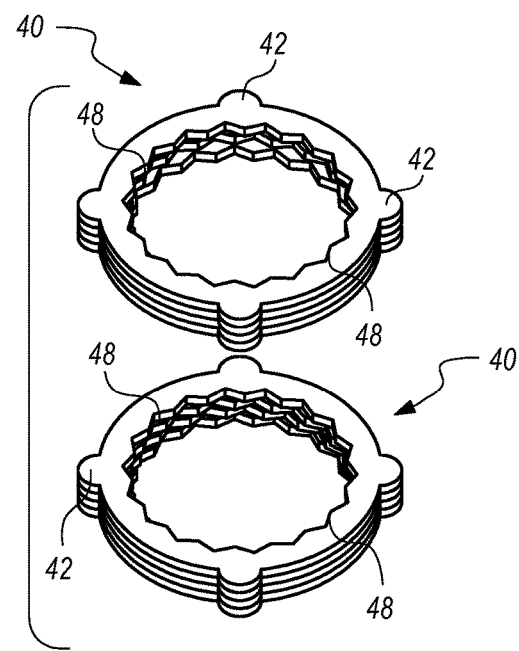
FIG. 6 is a detail view of the various configurations of the lock ring shown in FIG. 5.

The lock washer 40, as best seen in FIG. 6, is circular in confirmation. By using a circular ring, the force is evenly distributed on all sides of the surface in contact with its mating component. This creates a driving force that is not sheering the indexing tabs 42 in only one direction, thereby greatly increasing the washer's ability to fight deformation under load. Furthermore, by using circularly shaped indexing tabs 42, it makes machining the mating part faster and more efficient by reducing the need for a square female detents 36. Additionally, square indexing tabs are loaded in one direction when under load, thereby creating a sheer point perpendicular to its loading direction. In such a situation, a square indexing tab may be easily deformed and allow for movement, thus eliminating its effectiveness at maintaining its locking mechanism. These issues are cured by using circularly shaped indexing tabs.

The locking washer 40 includes a plurality of internal notches 48 that engage the head of the nut 38 to lock it in position. While various configurations of notches may be utilized, including, for example, twelve, eighteen, or twenty four, in a preferred embodiment, eighteen notches 48 are utilized in order to all the greatest amount of various locking angles (on 6-point, 12-point, and 24-point nuts) while keeping a high grip strength to the nut surface it is contacting. Furthermore, by varying the position of the four indexing tabs 42 on the lock washer 40, the washer 40 may be inserted into the flange retaining portion 34 in three different alignments, and by flipping the lock washer 40 over, it may be inserted in three additional alignments, for a total of six alignments. This is achieved by utilizing four indexing tabs 42, as opposed to the six indexing tabs commonly used in the prior art. Indeed, with this configuration, one is able to lock up the nut every 2.75 degrees, allowing for a vastly improved range of locking to minimize the rotation of the nut 38.

Figure 7A:
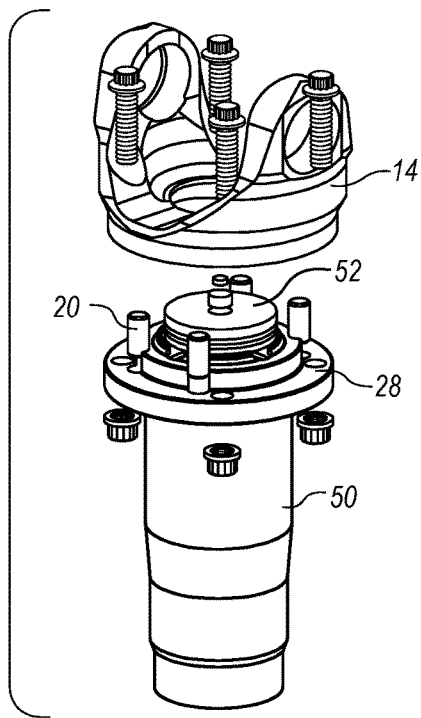
FIG. 7A is an exploded perspective view of another embodiment of the yoke assembly of the present disclosure.
Figure 7B:
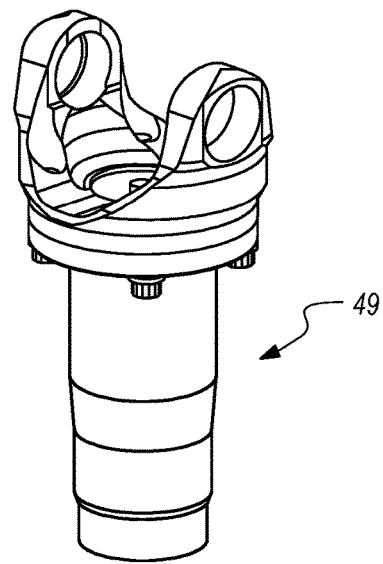
FIG. 7B is a perspective view of the yoke assembly shown in FIG. 7A.

Another embodiment of the present disclosure is a modular slip yoke assembly 49 as shown in FIGS. 7A-7B. In this regard, the same yoke portion 14 (as described above) is attached to a modular slip flange portion 50. Similar to the first embodiment described above, the slip flange portion has a flange base 28 configured to abut the yoke base 24 of the yoke portion 14. Furthermore, the slip flange portion 50 likewise includes a plurality of dowels 20 positioned within counterbores of the flange base 28 that extend upward, and are inserted into the recesses 22 in the yoke portion when the slip yoke assembly 49 is fully assembled. This embodiment further includes a slip yoke cap 52 positioned within a center bore of the flange base 28. Extending downward from the flange base 28 is a female shaft configured to slide over a fixed male splined component (not shown), thereby allowing the mating components to grow or shrink in length freely. The female and male components are well known in the art, with the unique aspect being presently disclosed is that the female slip flange portion 50 is of a modular design capable of being attached readily to the yoke portion 14 as previously described.

Figure 8A:
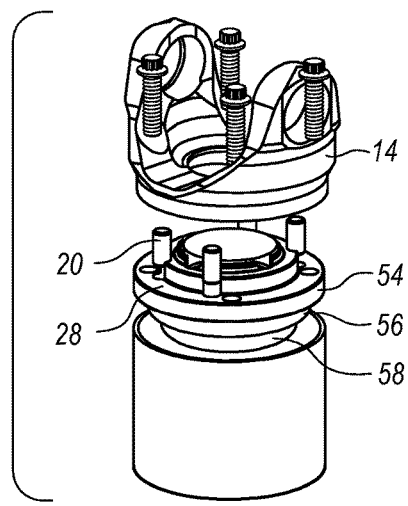
FIG. 8A is an exploded perspective view of a third embodiment of the yoke assembly of the present disclosure.
Figure 8B:
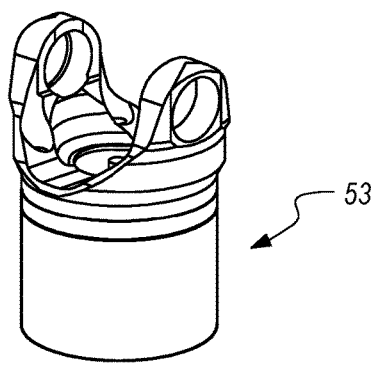
FIG. 8B is a perspective view of the yoke assembly shown in FIG. 8A.

Yet another embodiment of the present disclosure is a modular weld-on yoke assembly 53 as shown in FIGS. 8A-8B. Again, the same yoke portion 14 may be utilized in the assembly 53. In this embodiment, however, the flange portion is replaced with a weld-on flange portion 54. The weld-on flange portion 54, as above, includes a plurality of dowels 20 pressed into counterbores located in the flange base 28. In this embodiment, however, positioned below the flange base 28 is a plurality of base steps of decreasing diameter. As shown in FIG. 8A, there is a first step 56 having a diameter smaller than that of the flange base 28, and a second step 58 positioned below the first step 56 and having a diameter smaller than that of the first step 56. The benefit of having these decreasing diameter steps, is that the flange portion 54, can be utilized with multiple diameters of tubing, which can be welded to the appropriate step on the flange portion 54. Accordingly, a single weld-on flange portion 54, can be utilized with any modular yoke portion 14, and can also be utilized with multiple tubes on the opposite end, by welding the needed tube to the appropriately sized step.

As can be seen, one of the true benefits is that the yoke assemblies described herein are truly modular. That is, any modular yoke portion 14 can be utilized and combined with any modular flange portion 12, thereby greatly increasing the usability of the presently disclosed yoke assembly in numerous use scenarios, such as with transmissions, transfer cases, and axles. The modular design of the present disclosure is ready to be installed with 4 bolts at each end of the drive shaft. Using an impact gun, these 8 bolts can be removed and replaced 3-4 times faster than the standard U-bolt system of 8 nuts to be removed from the backside of the yoke with a wrench, as is common in the prior art. Further, the present disclosure enables the use of smaller diameter flanges and yokes (made from higher quality material) and by utilizing the 4 dowels and 4 smaller bolts of the present disclosure, the radius of the U-joint circumference of the present disclosure is able to fit in a smaller space with larger U-joints. Thus, the present assemblies are capable of being reduced in diameter by 20-30 percent from those of the prior art, and increasing the operating angle from the standard 22-35 degrees, all the way up to 55 degrees (or more).

The above description is given by way of example, and not limitation. Given the above disclosure, one skilled in the art could devise variations that are within the scope and spirit of the invention disclosed herein, including various using various types of flange portions, and improvements to retaining U-joints, such as by using both inside locks and outside locks simultaneously, thereby eliminating the failure of the standard outside snap ring when struck and damaged during use. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A modular driveline yoke assembly for use in a motor vehicle comprising:
   a yoke portion having two arms extending from a base, wherein the yoke base has a plurality of bolt holes extending through the yoke base, a plurality of recesses formed within a lower side of the yoke base, and an open centrally position bore;
   a flange portion configured at attach to another portion of a driveline, said flange portion having a base with a plurality of bolt holes extending through the flange base and a plurality of dowels extending upward from an upper side of the flange base, wherein the flange base includes a substantially circular and raised retaining portion formed into a central portion of the flange base, wherein the flange retaining portion comprises a plurality of inwardly facing detents formed within a sidewall of the retaining portion, and a retaining groove formed around the inside circumference of the flange retaining portion sidewalk;

a nut configured to sit within the flange retaining portion;

a circular lock washer configured to engage, and retain the nut, said lock washer having a plurality of internal notches that engage a head of the nut and a plurality of indexing tabs extending outward from its outside diameter and configured to be inserted within the retaining portion detents;

a C-clip positioned on the top of the lock washer, wherein the C-clip is seated within the retaining groove to maintain the lock washer in the position within the detent;

a plurality of bolts positioned within, and extending through, the plurality of bolt holes in the yoke base and the plurality of bolt holes in the flange base; and a plurality of nuts attached to the plurality of bolts;

wherein, when assembled, the yoke base and the flange base directly about each other, and the plurality of dowels extending from the upper side of the flange base are inserted into the plurality of recesses in the yoke base.

2. The modular driveline assembly of claim 1, wherein the yoke portion and flange portion are configured such that various yoke portions can be attached to various flange portions.

3. The modular driveline assembly of claim 1, comprising four bolts and four nuts.

4. The modular driveline assembly of claim 1, comprising of four dowels.

5. The modular driveline assembly of claim 1, wherein the dowels are unitarily formed within the flange base.

6. The modular driveline assembly of claim 1, wherein the dowels are pressed into the flange base.

7. The modular driveline assembly of claim 1, wherein the dowels are welded to the flange base.

8. The modular driveline assembly of claim 1, wherein the nut is selected from the group consisting of 6-point, 12-point, and 24-point nuts.

9. The modular driveline assembly of claim 1, wherein the lock washer has four indexing tabs distributed around the circumference of the lock washer.

10. The modular driveline assembly of claim 9, wherein the four indexing tabs are located equidistantly around the circumference of the lock washer.

11. The modular driveline assembly of claim 9, wherein the four indexing tabs are located at varying distances around the circumference of the lock washer.

12. The modular driveline assembly of claim 11, wherein the lock washer is configured to lock the nut every 2.75 degrees.

13. The modular driveline assembly of claim 1, wherein the indexing tabs are circular in shape.

14. The modular driveline assembly of claim 1, wherein the plurality of internal notches of the lock washer is selected from the group consisting of twelve, eighteen, and twenty-four notches.

15. The modular driveline assembly of claim 14, wherein the lock washer has eighteen internal notches.

* * * * *